United States Patent [19]

Marianowski

[11] Patent Number: 4,755,376
[45] Date of Patent: Jul. 5, 1988

[54] PROCESS FOR OPERATING A DUAL COMPARTMENT ANODE STRUCTURE

[75] Inventor: Leonard G. Marianowski, South Holland, Ill.

[73] Assignee: Institute of Gas Technology, Chicago, Ill.

[21] Appl. No.: 71,017

[22] Filed: Jul. 8, 1987

Related U.S. Application Data

[62] Division of Ser. No. 899,878, Aug. 25, 1986, Pat. No. 4,702,973.

[51] Int. Cl.[4] .............................................. H01M 8/04
[52] U.S. Cl. ..................................... 429/16; 429/17
[58] Field of Search .................................. 429/13–17, 429/19, 26, 34

[56] References Cited

U.S. PATENT DOCUMENTS

| | | | |
|---|---|---|---|
| 2,901,524 | 8/1959 | Gorin et al. | 429/17 |
| 3,592,941 | 7/1971 | Shultz, Jr. et al. | 429/16 |
| 4,404,267 | 9/1983 | Iacovangelo et al. | 429/41 X |
| 4,647,516 | 3/1987 | Matsumura et al. | 429/16 X |

*Primary Examiner*—Anthony Skapars
*Attorney, Agent, or Firm*—Thomas W. Speckman; Ann W. Speckman

[57] ABSTRACT

A dual compartment anode structure for use in molten carbonates fuel cells having an electrolyte porous metallic plate structure with one face adapted to contact the electrolyte and an opposite face having a plurality of ribs extending therefrom, a hydrogen ion and molecular hydrogen and electrolyte non-porous metallic foil having one face in contact with the ends of the ribs to define an anode reacton gas compartment therebetween, and a corrugated metallic current collector having a plurality of peaks with one face at the peaks in contact with the opposite face of the metallic foil defining an anode fuel gas compartment therbetween. The dual compartment anode structure of this invention provides separation between the electrolyte and the fuel thereby permitting internal cell reforming of hydrogen containing fuels without poisoning of the reforming catalyst and provides greater cell stability due to reduction in corrosion and reduced electrolyte and electrode loss.

20 Claims, 1 Drawing Sheet

PROCESS FOR OPERATING A DUAL COMPARTMENT ANODE STRUCTURE

This application is a divisional application of Ser. No. 899,878, filed Aug. 25, 1986, now U.S. Pat. No. 4,702,973.

BACKGROUND OF THE INVENTION

1. Field of the Invention

A dual compartment anode structure for use in molten carbonate fuel cells. The anode of this invention isolates the molten carbonates electrolyte from contaminated fuel gases and isolates internal reforming catalysts from the molten carbonates electrolyte.

2. Description of the Prior Art

Molten carbonate fuel cells generally comprise a cathode and an anode with their current collectors and an electrolyte tile making contact with both electrodes. Under fuel cell operating conditions, in the range of about 500° to about 700° C., the entire electrolyte tile, the carbonate and the inert support material, forms a two phase structure with liquid carbonate and solid inert support. The electrolyte diaphragms of this type are known as "matrix type" or "paste electrolytes". The electrolyte is in direct contact with the electrodes as is fuel on the anode side and oxidant on the cathode side. Prior art molten carbonate fuel cell anodes are generally porous sintered metallic structures with the molten carbonates electrolyte entering the pores from one side and fuel entering the pores from the adjacent fuel compartment on the other side. Fuel cell performance losses are known to be caused by contamination of the electrolyte by sulfides and chlorides which may be present in impure fuel gases, such as may be obtained from gasification of naturally occurring organic carbonaceous materials, such as coal. See, for example, "Effects of $H_2S$ on Molten Carbonate Fuel Cells", Robert J. Remick, Final Report, U.S. Department of Energy Contract DE-AC21-83MC20212; DOE/MC/20212-2039 (DE 86010431) May 1986. When using gasification products as fuel, it is desirable to reform the products to enhance the hydrogen content of the fuel by internal reforming within the fuel cell. However, conventional reforming catalysts are known to be poisoned by molten carbonates electrolytes due to active sites being covered by a film of carbonates. See "Development of Internal Reforming Catalysts for the Direct Fuel Cell", Michael Tarjanyi, Lawrence Paetsch, Randolph Bernard, Hossein Ghezel-Ayagh, 1985 Fuel Cell Seminar, Tucson, Ariz., May 19-22, 1985, pgs. 177-181. Additional known problems causing failure in long term endurance of molten carbonate fuel cells also include deformation of the porous anode structure, corrosion of anode side hardware such as current collector, separator plate, and the like, by the molten carbonates electrolyte and electrolyte loss thereby, gas cross-over through the porous anode, and electrolyte loss by anode and cathode dissolution. There have been many attempts to solve one or more of these problems to provide long term fuel cell stability and endurance.

U.S. Pat. No. 3,592,941 teaches a molten carbonate electrolyte fuel cell having a porous cathode separated by the molten carbonates electrolyte from a noble metal membrane anode. The noble membrane anode is porous only to hydrogen and separates the anode fuel compartment from the electrolyte. The U.S. Pat. No. 3,592,941 teaches only a single anode compartment and only a metallic membrane anode structure. U.S. Pat. No. 4,404,267 teaches an anode composite for molten carbonate fuel cells wherein copper plated ceramic particles are plated on the face of a porous anode to form a bubble pressure barrier adjacent the electrolyte tile, the pores being sized significantly smaller than the pores of the anode and sized to fill with electrolyte. U.S. Pat. No. 4,448,857 teaches a similar porous structure suitable for a cathode composite. U.S. Pat. No. 4,507,262 teaches a porous sintered copper blank plate affixed to the face of a porous anode wherein the pores are filled with metal oxide by use of an organometallic precurser to provide a bubble pressure barrier. U.S. Pat. No. 3,508,969 teaches a galvanic cell having a metal foil face on a porous fuel electrode to prevent electrolyte contact with the electrode during heating to cell operation temperature followed by consumption of the metal foil at cell operating temperatures. U.S. Pat. No. 2,901,524 teaches transfer of anode reaction products to the cathode inlet stream exterior to a fuel cell.

SUMMARY OF THE INVENTION

It is an object of this invention to provide a dual compartment anode structure for use in molten carbonate fuel cells providing long term endurance and stability of fuel cell operation.

It is another object of this invention to provide a dual compartment anode structure for use in molten carbonates fuel cells permitting use of sulfide and chloride contaminated fuels such as are obtained from gasification of naturally occurring organic carbonaceous materials.

It is still another object of this invention to provide an anode structure for molten carbonates fuel cells whereby reforming catalysts may be used internally without poisoning of the catalyst by the carbonates electrolyte.

It is another object of this invention to provide an anode structure for use in molten carbonates fuel cells which reduces deformation of the anode structure.

It is yet another object of this invention to provide an anode structure for use in molten carbonates fuel cells which reduces corrosion of anode hardware, such as the metal current collector and the cell housing structure.

It is another object of this invention to provide an anode structure for use in molten carbonates fuel cells wherein the products of the anode reaction may be passed to the inlet of the cathode compartment within the cell.

It is still another object of this invention to provide an anode structure for use in molten carbonates fuel cells with reduced electrolyte loss and concomitant cathode dissolution.

The dual compartment anode structure for use in molten carbonates fuel cells according to this invention has an electrolyte porous sintered metallic plate structure having one face adapted to contact the electrolyte and an opposite face having ribs extending therefrom. A hydrogen ion porous and molecular hydrogen and electrolyte non-porous metallic foil has one face in contact with the ends of the ribs extending from the porous sintered metallic plate structure so that the opposite face and ribs of the sintered metallic plate structure and the one face of the metallic foil define an anode reaction gas compartment. A corrugated metallic current collector has one face at the peaks of the corrugations in contact with the opposite face of the metallic foil, one face of the corrugated metal current collector and the opposite face of the metallic foil defining an anode fuel gas compartment. Thus, the anode structure has a reaction gas compartment separated from a fuel compartment by a hydrogen ion porous metallic foil. With use of this structure, when hydrogen fuel is contaminated with materials which are detrimental to the electrochemical reaction or to the molten carbonates electrolyte, they are maintained in separated relation by the hydrogen ion porous metallic foil. This permits direct use of hydrogen containing fuel, such as natural gas or fuel obtained by gasification of naturally occurring organic carbonaceous materials, such as coal, which further contain deliterious materials, such as sulfides and chlorides. The anode configuration according to this invention further renders internal reforming of such fuels practical since a reforming catalyst may be placed in the fuel gas compartments and maintained in separated relation from the molten carbonates electrolyte thereby preventing poisoning of the reforming catalysts by the molten carbonates electrolyte.

The dual compartment anode configuration of this invention also prevents contact of the anode side hardware, such as a current collector and cell housing, by the molten carbonates electrolyte thereby substantially reducing corrosion of the anode side hardware. This reduction or prevention of corrosion of the anode side hardware further improves electrolyte management by reducing or eliminating evaporation through the anode and corrosion areas as a mechanism of carbonate loss. The dual compartment anode structure molten carbonates fuel cell anode of this invention provides higher carbon dioxide concentration in the region of the cathode, both by passage through the electrolyte to the cathode and by passage from the anode reaction gas compartment to the oxidant compartment, which reduces cathode dissolution as well as electrolyte evaporation. In the dual compartment anode structure molten carbonates fuel cell anode of the present invention, the non-porousmetallic foil serves as a barrier to gas cross over and allows the fuel cell to operate with substantial differences in pressure across the cell.

The dual compartment anode of this invention alters the conventional process for molten carbonate electrolyte fuel cell operation. In the fuel cell process of this invention, hydrogen containing fuel is supplied to an anode fuel compartment, the fuel compartment being separated from an anode reaction gas compartment by a hydrogen ion porous and molecular hydrogen and electrolyte non-porous metallic foil. The molecular hydrogen is dissociated to ionic hydrogen on the metallic foil in the fuel compartment. Ionic hydrogen is passed through the metallic foil to the anode reaction gas compartment which comprises a porous metallic anode structure adjacent said molten carbonate electrolyte. In the porous anode structure, ionic hydrogen is reacted with carbonate ions producing water, carbon dioxide, and electrons. Produced water, carbon dioxide and two electrons are passed to a porous metallic cathode structure on the opposite side of the molten carbonate electrolyte. Oxygen is supplied to an oxidant compartment which comprises the porous cathode structure. In the porous cathode structure, carbon dioxide, oxygen and electrons are reacted to produce carbonate ions and water is removed from said oxidant compartment.

BRIEF DESCRIPTION OF THE DRAWING

The above and other objects and advantages of this invention will become apparent upon reading of the description of preferred embodiments and reference to the drawing wherein.

DESCRIPTION OF THE PREFERRED EMBODIMENTS

In the conventional molten carbonate fuel cell anode a porous metal anode, usually comprising nickel or nickel-chromium alloy, has one side in contact with the molten carbonates electrolyte matrix and the other side exposed to the fuel gas stream. The pores of the conventional anode are partially filled with liquid electrolyte and the electrochemical reactions occur at sites of the three phase solid (anode metal)-liquid (carbonate electrolyte)-gas (hydrogen fuel) interface. Carbon dioxide and water products of the anode reaction in a conventional fuel cell anode diffuse back from the three phase reaction sites into the fuel gas chamber. Carbonate ions are supplied to the anode reaction sites by ionic transport through the electrolyte from the cathode side of the fuel cell where they are generated by the electrochemical reaction between oxygen and carbon dioxide. To furnish the carbon dioxide required, it is necessary, in the conventional fuel cell, to recover carbon dioxide from the spent fuel gases leaving the anode exhaust and supply the recovered carbon dioxide to the cathode compartment.

Figure 1:
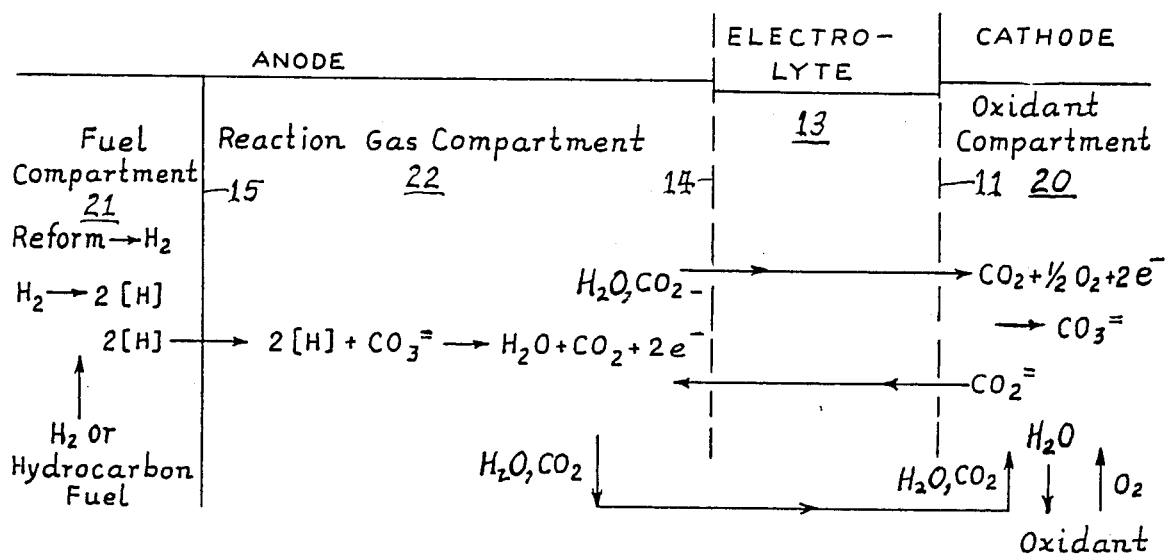
FIG. 1 is a highly schematic representation of the electrochemical reactions in a fuel cell utilizing the dual compartment anode of this invention.

The dual compartment anode structure of this invention modifies the anode electrochemical reaction mechanisms from the conventional electrochemical systems as described above. By reference to highly schematic FIG. 1, the dual compartment anode structure shown comprises fuel compartment 21 separated by hydrogen ion porous and molecular hydrogen and electrolyte non-porous metallic foil 15 from reaction gas compartment 22 which is separated from electrolyte 13 by electrolyte porous sintered metallic plate structure 14. In fuel compartment 21, molecular hydrogen fuel adsorbs and dissociates on a dry catalytic nickel structure forming ionic hydrogen which diffuses through hydrogen ion porous solid foil 15 to reaction gas compartment 22. The anode electrochemical reactions occur at the three phase sites in porous anode structure 14 wherein the ionic hydrogen reacts with carbonate ions to form water and carbon dioxide with the release of two electrons. The formed water vapor and carbon dioxide migrate to reaction gas compartment 22, not being able to pass through hydrogen ion porous solid foil 15, or diffuse through electrolyte 13 to cathode 11 for support of the cathode electrochemical reactions. Thus, mixing of the formed water vapor and carbon dioxide with the fuel gas is completely eliminated and the carbon dioxide made available for the cathode electrochemical reactions either by diffusion through the electrolyte or by direct transferance from the reaction gas compartment 22.

Theoretically, a molten carbonate fuel cell having an anode according to this invention could operate with hydrogen and oxygen as the only gases supplied and with water and produced electricity as the only products removed from the cell. The fuel compartment would be supplied with pure hydrogen which would dissociate and diffuse through the hydrogen ion porous solid foil and react with carbonate ions to produce water vapor and $CO_2$. The water vapor and $CO_2$ would diffuse through the porous electrolyte matrix to the cathode where the $CO_2$ would react with the oxide ions generated by the cathode electrochemistry to reform the carbonate ions, the produced water vapor diffusing through the cathode structure into the oxidant compartment 20. The oxidant compartment need be supplied only oxygen and the necessary carbon dioxide to maintain concentration of carbon dioxide at the cathode at the minimum cathode polarization level, the carbon dioxide for cathode electrochemistry being supplied by diffusion from the anode across the electrolyte matrix. The water vapor produced in the anode reaction would diffuse through the cathode structure to the oxidant compartment and it is only necessary to remove water vapor from the oxidant compartment to prevent buildup. This can be easily achieved by circulation of the oxidant compartment exhaust through a cathode heat exchanger to condense out the water for discharge and recycle the gas to the cathode compartment with provision for oxygen and carbon dioxide being added as required. Operation of a cell toward such theoretical functioning may be achieved using the cell of this invention since the anode side of the cell may be operated at a higher pressure than the cathode side thereby pressure driving the desired conditions. Also, the anode configuration of this invention allows internal cell circulation from the reaction gas compartment of the anode to the oxidant compartment of the cathode for more complete transferance of product water and carbon dioxide.

Figure 2:
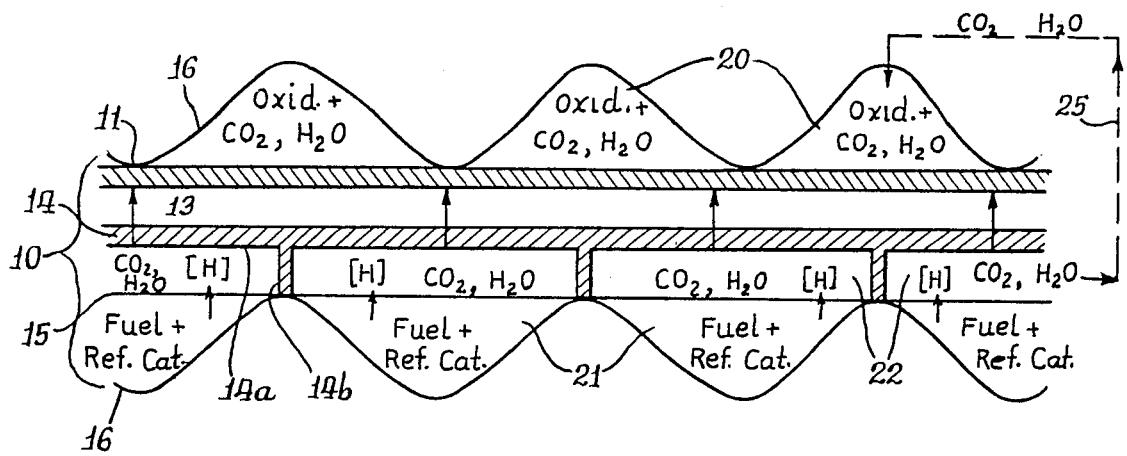
FIG. 2 is a schematic cross section of a fuel cell unit utilizing one embodiment of a dual compartment anode structure according to this invention.

FIG. 2 shows in cross section one embodiment of the dual compartment anode of this invention in a cell unit of a molten carbonate fuel cell. Cell unit 10 is shown with cathode 12, molten carbonate electrolyte 13 and dual compartment anode 17. Cathode 12 comprises porous metal oxide cathode 11 with corrugated current collector 16 forming cathode oxidant compartments 20 at the side opposite electrolyte 13. Anode 17 comprises electrolyte porous sintered metallic plate structure 14a having ribs 14b extending therefrom, a hydrogen ion porous and molecular hydrogen and electrolyte nonporous metallic foil 15 with one face in contact with the ends of ribs 14b forming anode reaction gas compartments 22, and corrugated metallic current collector 16 having one face of the peaks of the metallic corrugations in contact with metallic foil 15 and defining fuel compartments 21 therebetween. The configuration of a cell unit as shown in FIG. 2 is especially suitable for stacked cells wherein current collector 16 also serves as a cell separator and internal electrical conductor for conduction of electrons from the anode to the cathode.

The dual compartment anode of this invention may be fabricated from porous metallic anode structure 14 comprising flat plate portion 14a of porous metallic sintered materials providing high surface areas and extending ribs 14b. Suitable porous metallic electrode structures include those such as described in U.S. Pat. No. 4,247,604 and references cited therein. Generally, the porous metallic anodes are principally nickel, iron or cobalt with added stabilizing agents. Any suitably porous, stable, and catalytic material for the anode reaction may be used for the porous portion of the anode of this invention. While extending ribs 14b are shown to be the same structure as porous metallic flat plate anode portion 14a, it is not necessary that these ribs be of porous construction. The ribs may be of non-porous metallic material in a composite with electrolyte porous sintered metallic plate structure 14a. By the term "rib", I mean any extension from porous flat plate anode portion 14a which, in combination with solid metallic foil 15, forms anode reaction gas compartments 22 adjacent the face of porous metallic plate structure 14a opposite to electrolyte 13. Hydrogen ion porous solid metallic foil may be of any metal which does not interfere with anode reactions and provides sufficient hydrogen ion diffusion through the foil. Suitable metals include palladium, nickel, cobalt, iron, ruthenium, rhodium, osmium, iridium, platinum, titanium, zirconium, hafnium, vanadium, niobium, tantalum, copper, silver and gold, and alloys thereof, particularly palladium, copper nickel and palladium silver alloys. Membrane foils of copper, nickel, and mixtures thereof are particularly preferred due to their high electrical conductivity, high mechanical stability, and low cost. Suitable thicknesses of the foils are about 0.0001 to about 0.001 inch, the lower limit being limited by the requirement of providing a hole-free foil. Preferably, the foils are thinner than 0.0005 inch. A mechanical support, such as an inert porous support of perforated metal, expanded metal, or a conductive porous ceramic, may be used to allow the use of thinner foils to provide higher hydrogen ion diffusion through the solid metallic foil. Solid metallic foils have, been found to provide sufficient hydrogen ion diffusion to sustain current densities in excess of about 160 mA/cm$^2$. Current collector plate 16 may be formed as described as U.S. Pat. No. 4,579,788 and for use in stacked cells, may also serve as a bimetallic separator plate as described in that patent. By the term "corrugated" metalic current collector, I mean any shape having ridges extending in a fashion to provide electrical contact with solid foil 15 and/or porous anode structure 14 and in combination with solid foil 15 form fuel compartments 21.

Molten carbonate electrolyte 13 may be any suitable molten carbonate electrolyte for use in fuel cells, such as alkali metal carbonates of lithium, potassium and sodium and their binary or ternary carbonates, such as described in U.S. Pat. No. 4,079,171. The electrolyte may be reinforced as known to the art. Cathode structure 12 includes any suitably porous metal oxide cathode 11 as known to the art, usually nickel, lithium ferrites, and lithium manganates, between molten carbonate electrolyte 13 and oxidant compartment 20 defined by porous metal oxide cathode 11 and current collector 16.

In one embodiment of the dual compartment molten carbonate fuel cell anode of this invention, a hydrocarbon reforming catalyst is contained within fuel compartments 21 to provide reforming of hydrocarbon fuels internal to the fuel cell. Internal steam reforming may advantageously be performed in situ in the anode fuel compartments 21 by placing supported catalysts in the compartments, such as by deposition on the interior of the current collector walls. The reforming catalyst in the anode of this invention is isolated from the molten carbonates electrolyte by solid metallic foil 15 and therefore carbonates poisoning of the reforming catalyst is not a problem. Conventional reforming catalysts, such as supported nickel, may be used unless detrimentally affected by contaminated fuel gas. Likewise, the fuel gas fed to fuel compartments 21 is isolated from the carbonate electrolyte preventing contamination of the electrolyte by sulfides and chlorides which might be introduced by the fuel stream. Thus, the extent of such contaminant concentration in the fuel gas is limited only by poisoning of the reforming catalyst, when used. To allow direct use of natural gas and products of gasification of naturally occurring organic carbonaceous materials reforming catalysts which are sulfur tolerant may be used. The dual compartment molten carbonate fuel cell anode of this invention may utilize medium Btu fuels derived from naturally occurring organic carbonaceous materials over long operating periods of time with sulfide and chloride contaminant cleanup of the gas limited only to the tolerance of a reforming catalyst when internal reforming is utilized.

As shown in FIG. 2, utilizing the dual compartment anode of this invention, it is practical to convey the carbon dioxide and water remaining from anode reaction gas compartments 22 by simple manifolding at the open ends of these compartments to cathode oxidant compartments 20 as shown by internal manifold 25. Since solid foil 15 acts as a gas barrier, the anode compartments may be operated at higher pressure than the cathode oxidant compartments to reduce crossover of the fuel and oxidant gases.

In the practical operating cell of the type described where air is used as an oxidant and impure hydrogen is used as a fuel, exhausts are desired from both the fuel compartment and the oxidant compartment to carry away the unreacted gases.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for molten carbonate electrolyte fuel cell operation comprising: supplying hydrogen containing fuel to a fuel compartment, said fuel compartment separated from an anode reaction gas compartment by a hydrogen ion porous and molecular hydrogen and electrolyte non-porous metallic foil; dissociating said hydrogen to ionic hydrogen; passing said ionic hydrogen through said metallic foil to said anode reaction gas compartment which comprises a porous metallic anode structure adjacent said molten carbonate electrolyte; reacting in said porous anode structure said ionic hydrogen with carbonate ion producing water, carbon dioxide, and electrons; passing said produced water, carbon dioxide and two electrons to a porous metallic cathode structure on the opposite side of said molten carbonate electrolyte; supplying oxygen to an oxidant compartment which comprises said porous cathode structure; reacting in said porous cathode structure said carbon dioxide, oxygen and electrons to producing carbonate ions for passage to said cathode; and removing water from said oxidant compartment.

2. The process of claim 1 comprising the additional step of catalytically reforming at least a portion of hydrocarbons in said fuel to hydrogen in the presence of a hydrocarbon reforming catalyst in said fuel compartment.

3. The process of claim 1 wherein carbon dioxide is passed through a conduit means from said anode reaction gas compartment to said oxidant compartment.

4. In a process for electrical production by molten alkali carbonate electrolyte fuel cells, the improvement comprising: supplying hydrogen containing fuel to a fuel compartment, said fuel compartment separated from an anode reaction gas compartment by a hydrogen ion porous and molecular hydrogen and electrolyte non-porous metallic foil; dissociating said hydrogen to ionic hydrogen; and passing said ionic hydrogen through said metallic foil to said anode reaction gas compartment which comprises a porous metallic anode structure adjacent said molten carbonate electrolyte.

5. In the process of claim 4 comprising the additional step of catalytically reforming at least a portion of hydrocarbons in said fuel to hydrogen in the presence of a hydrocarbon reforming catalyst in said fuel compartment.

6. In the process of claim 4 wherein carbon dioxide formed in said anode reaction gas compartment is passed through a conduit means to an oxidant compartment associated with the cathode of said fuel cell.

7. The process of claim 1 wherein said metallic foil is about 0.0001 to about 0.001 inch thick.

8. The process of claim 1 wherein said metallic foil is selected from the group consisting of copper, nickel, and mixtures thereof.

9. The process of claim 1 wherein exhaust removed from said oxidant compartment is passed through a heat exchanger condensing water for discharge and recycling gas to said oxidant compartment.

10. The process of claim 11 wherein carbon doxide is provided to said oxidant compartment in an amount at least sufficient to maintain carbon dioxide concentration at said cathode at the minimum cathode polarization level.

11. The process of claim 1 wherein said ionic hydrogen passage through said metallic foil is sufficient to sustain current densities in excess of about 160 ma/cm$^2$.

12. The process of claim 11 wherein said anode reaction gas compartment is maintained at a higher pressure than said cathode.

13. The process of claim 11 wherein said metallic foil is about 0.0001 to about 0.001 inch thick; said metallic foil is selected from the group consisting of copper, nickel, and mixtures thereof; said ionic hydrogen passage through said metallic foil is sufficient to sustain current densities in excess of about 160 ma/cm$^2$, and said anode reaction gas compartment is maintained at a higher pressure than said cathode.

14. The process of claim 4 wherein said metallic foil is about 0.0001 to about 0.001 inch thick.

15. The process of claim 4 wherein said metallic foil is selected from the group consisting of copper, nickel, and mixtures thereof.

16. The process of claim 4 wherein exhaust removed from said oxidant compartment is passed through a heat exchanger condensing water for discharge and recycling gas to said oxidant compartment.

17. The process of claim 4 wherein carbon doxide is provided to said oxidant compartment in an amount at least sufficient to maintain carbon dioxide concentration at said cathode at the minimum cathode polarization level.

18. The process of claim 4 wherein said ionic hydrogen passage through said metallic foil is sufficient to sustain current densities in excess of about 160 ma/cm$^2$.

19. The process of claim 4 wherein said anode reaction gas compartment is maintained at a higher pressure than said cathode.

20. The process of claim 4 wherein said metallic foil is about 0.0001 to about 0.001 inch thick; said metallic foil is selected from the group consisting of copper, nickel, and mixtures thereof; said ionic hydrogen passage through said metallic foil is sufficient to sustain current densities in excess of about 160 ma/cm$^2$, and said anode reaction gas compartment is maintained at a higher pressure than said cathode.

* * * * *